US012669367B2

(12) United States Patent
Beckmann et al.

(10) Patent No.: US 12,669,367 B2
(45) Date of Patent: Jun. 30, 2026

(54) KITCHEN APPLIANCE SYSTEM AND METHOD OF AUTOMATIC TARING FOR A KITCHEN APPLIANCE SYSTEM

(71) Applicant: Vorwerk & Co. Interholding GmbH, Wuppertal (DE)

(72) Inventors: Nils Beckmann, Remscheid (DE); Torsten Lang, Solingen (DE); Miron Sernecki, Hagen (DE); Felix Haunschild, Essen (DE); Kevin Schmitz, Haan-Gruiten (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 463 days.

(21) Appl. No.: 18/117,658

(22) Filed: Mar. 6, 2023

(65) Prior Publication Data

US 2023/0280205 A1      Sep. 7, 2023

(30) Foreign Application Priority Data

Mar. 7, 2022      (EP) ..................................... 22160529

(51) Int. Cl.
| | |
|---|---|
| G01G 23/16 | (2006.01) |
| A47J 36/32 | (2006.01) |
| A47J 43/046 | (2006.01) |
| A47J 43/07 | (2006.01) |
| G01G 19/56 | (2006.01) |

(52) U.S. Cl.
CPC .............. *G01G 23/16* (2013.01); *A47J 36/32* (2013.01); *A47J 43/046* (2013.01); *A47J 43/0727* (2013.01); *G01G 19/56* (2013.01); *A47J 2043/0733* (2013.01)

(58) Field of Classification Search
CPC ........ G01G 19/52; G01G 19/56; G01G 23/16; A47J 2043/0733
See application file for complete search history.

(56) References Cited

U.S. PATENT DOCUMENTS

| | | | |
|---|---|---|---|
| 7,416,119 B1 * | 8/2008 | Inderrieden | .............. G07G 1/14 235/383 |
| 2019/0101434 A1 | 4/2019 | Koetz | |

(Continued)

FOREIGN PATENT DOCUMENTS

| | | | |
|---|---|---|---|
| CN | 111417843 A | 7/2020 | |
| DE | 202009003480 U1 * | 8/2009 | ........... G01G 15/001 |

(Continued)

*Primary Examiner* — Natalie Huls
(74) *Attorney, Agent, or Firm* — The Webb Law Firm

(57) ABSTRACT

The invention relates to a kitchen appliance system with a base unit having a housing and with at least one accessory having an identification feature. A weighing module configured for recording a gross weight and a control device are provided at the base unit. Furthermore, a detection device configured to detect an identification feature of at least one accessory is provided at the base unit, and the control device is configured to detect a change in position of the at least one accessory relative to the base unit relative to the base unit, to retrieve weight information corresponding to an identification feature detected by the detection device, and to calculate a net weight based on a gross weight detected by the weighing module and taking into account the weight information. A corresponding method is also described.

15 Claims, 3 Drawing Sheets

(56)  References Cited

U.S. PATENT DOCUMENTS

| | | | |
|---|---|---|---|
| 2020/0363258 A1 | 11/2020 | Starmans et al. | |
| 2021/0216989 A1* | 7/2021 | Teraoka | G01B 21/22 |
| 2023/0281146 A1* | 9/2023 | Beckmann | G06F 13/4068 |
| | | | 710/305 |
| 2023/0284827 A1* | 9/2023 | Beckmann | A47J 43/0766 |
| 2023/0304845 A1* | 9/2023 | Currie | G01G 23/163 |

FOREIGN PATENT DOCUMENTS

| | | | |
|---|---|---|---|
| DE | 102014111193 A1 | | 2/2016 |
| JP | H587618 A | | 4/1993 |
| JP | 2001349771 A | | 12/2001 |
| JP | 2007107957 A | | 4/2007 |
| JP | 3135150 U | * | 9/2007 |
| JP | 202156917 A | | 4/2021 |
| WO | 2017182075 A1 | | 10/2017 |

* cited by examiner

1

KITCHEN APPLIANCE SYSTEM AND METHOD OF AUTOMATIC TARING FOR A KITCHEN APPLIANCE SYSTEM

CROSS-REFERENCE TO RELATED APPLICATION

This application claims priority to European Patent Application No. 22160529.8 filed Mar. 7, 2022, the disclosure of which is hereby incorporated by reference in its entirety.

BACKGROUND OF THE INVENTION

Field of the Invention

The invention relates to a kitchen appliance system with a base unit having a housing and with at least one accessory having an identification feature, wherein a weighing module configured for detecting a gross weight is provided at the base unit, and wherein a control device is provided at the base unit. Also an object of the invention is a method for automatic taring for such a kitchen appliance system.

Description of Related Art

Kitchen appliances of the type mentioned above are already known, in particular for processing raw or semi-finished food products. These kitchen appliances have a base unit with which separate functional parts interact to process a food product depending on the dish, drink or the like obtained. Functional parts are usually sold by kitchen appliance suppliers as accessories, for example, cooking vessel, cooking vessel, lid, chopping or stirring attachment. Generally, the accessory and the base unit each have interfaces that are compatible with each other and enable the two components to work together. In particular, interfaces brought into interaction with each other can be used to drive a movable component of the accessory by means of an electric motor arranged in the base unit.

A weighing module is provided at the base unit for recording a gross weight. Preferably, a gross weight corresponds to the total weight of a filled or unfilled accessory that is assembled with the base unit. Further preferably, the gross weight also takes into account the value that the weighing module measures when empty, i.e. when no accessory or other goods are accommodated on the base unit. The recorded gross weight can also include the respective tare weight of several accessories simultaneously attached to the base unit, with or without contents.

In general, a weighing module, like most sensors, must be calibrated in order to obtain a meaningful measurement result. In the case of a weighing module, calibration is carried out by means of a so-called taring process, which is usually guided or controlled by a manual user input. Thus, when the weighing module is in a certain state, the then recorded value or the currently measured gross weight is defined as "zero" and stored as the tare weight. This tare weight is subtracted from the then current recorded weight for later weight recordings in order to calculate or display a net weight.

In other words, the gross weight is the value detected by the weighing module and the net weight is the own weight to be determined of a good possibly picked up by an accessory.

A kitchen appliance with a weighing device is known, for example, from DE 10 2014 111 193 A1. For taring, a recorded gross weight can be set to zero on this Kitchen appliance by user input, i.e. manually. Alternatively, a gross weight detected during start-up of the known Kitchen appliance can be automatically defined as "zero".

In order to minimise the effort on the part of the user, another Kitchen appliance is proposed by the publication EP 3446081 A1, whereby an accessory is recognised and thus also its own weight, assigned to the identification code and previously stored, is automatically taken into account for the calculation of a net weight.

When carrying out a preparation, it often happens that ingredients are assembled withe after the other into the same accessory or that an accessory is assembled or removed several times. However, a disadvantage of the known Kitchen appliances is that taring is carried out several times, especially when another ingredient is added. In addition, other, additional accessories can be assembled, which falsify the weight measurement.

SUMMARY OF THE INVENTION

Against this background, the present invention is based on the problem of improving known Kitchen appliance systems and, in particular, increasing the prospects of success and user-friendliness when using a kitchen appliance system.

This problem is solved by a kitchen appliance system of the type mentioned at the beginning in that a detection device configured to detect an identification feature of at least one accessory is provided at the base unit, and in that the control device is configured to detect a change in position of the at least one accessory relative to the base unit, to retrieve weight information corresponding to an identification feature detected by the detection device and to calculate a net weight on the basis of a gross weight detected by the weighing module and taking into account the weight information.

The kitchen appliance system offers an automatic, intelligent tare function. This not only guarantees the success of a preparation process carried out on the kitchen appliance system, but also increases user-friendliness. In particular, it is possible to dispense with a dedicated, manual user input for performing a tare and still accurately determine a net weight for an ingredient.

By automatically identifying and detecting the assembly or removal of an accessory, a net weight for any contents picked up can be determined automatically with increased security and reduced user effort.

In addition, the kitchen appliance system according to the invention can be used to accurately determine a net weight for an ingredient quantity that has been changed on an accessory not used with the base unit, for example by filling or emptying in a position not attached to the base unit. The net weight can also be calculated automatically by taking into account the weight of other accessories that are used during the preparation process.

A base unit in the sense of the present invention is preferably designed as a base for the use of accessories by having an interface for interaction with at least one accessory. The base unit has a housing wherein an electric motor for driving accessories is arranged. The electric motor interacts with an accessory assembled with the base unit via the interface of the base unit.

Accessory is understood to be any part designed for interaction with the base unit. The accessory may be directly or indirectly assembled with the base unit, wherein for direct assembly the accessory has an interface compatible with the interface of the base unit, and wherein for direct assembly the accessory is attached to another accessory which is in turn directly assembled with the base unit. The term "assembly" includes, but is not limited to, the actions from the list: Connecting, coupling, mounting, attaching, fitting and the like. In particular, an accessory is designed to extend the function of the base unit, for example as a cutting, stirring, cooking, weighing, cooking, steaming or covering unit. The function for which the accessory is intended preferably designates the type of accessory.

The term identification feature or identifier includes any information about the type and/or a property of the accessory. Preferably, the identification feature is sufficient to identify or assign an accessory in the context of a database of multiple identification features. An identification feature in the sense of the invention can be a type of accessory, such as a cutting, stirring, cooking, weighing, cooking, steaming or covering attachment, and/or a serial number.

The information feature is preferably stored on a data carrier which is integrated in the base body of the accessory or permanently attached to the base body of the accessory. Several data carriers can be provided, each of which carries an identification feature and which are arranged at different positions on the accessory. Thus, depending on the position of use or the direction wherein the accessory is assembled with the base unit, an identification feature corresponding to the position of use can be detected. Alternatively or additionally, a data carrier can have several identification features, each of which is detected depending on the assembly position of the accessory on the base unit. In particular, a data carrier can be switchable, for example with the aid of a magnet, and provide a corresponding identification feature for detection depending on the switching position or switching state. In this way, a suitable quick-start mode can be automatically called up for an accessory that can assume several operating positions on the base unit, depending on its current operating position.

The detection device or detector at the base unit is configured to detect the identification feature of the accessory. For example, if the identification feature is stored in the form of a QR code, the detection device or detector is preferably designed as an optical reader. The detection device can also be a reader for a data memory connected to an RFID antenna, a part of a Bluetooth system or a part of a bus system.

A weighing module configured to detect a gross weight is provided at the base unit, the weighing module preferably being sufficiently sensitive to detect small variations in weight. In particular, the weighing module may be configured to detect a weight variation caused by the addition or removal of an accessory that is not intended to hold an ingredient. For example, the weighing module is sufficiently sensitive to detect a weight variation brought about by the assembly or removal of a cutting or stirring attachment.

Furthermore, a control device or controller is arranged in the housing or at the housing of the base unit. The control device or controller preferably comprises a processor with a storage medium. In particular, a computer program with instructions may be stored on the storage medium, the execution of which by the processor causes the kitchen appliance to perform an operating procedure. A database containing identification features, weight information and/or cooking information may be stored on the storage medium.

In particular, the control device may be configured to receive and process a gross weight detected by the weighing module and an identification feature detected by the detection device in real time or simultaneously. Alternatively or additionally, the control device may be configured to first detect a change in position of an accessory and only then command the detection device to perform a detection operation to identify the accessory.

The control device is preferably configured to compare a detected identification feature with identification features from a database in order to identify the accessory having the detected identification feature. In this case, it is advantageous to design the database with stored identification features to which weight information is assigned for the corresponding accessory.

Weight information in the sense of the invention is preferably a value for the own weight of an accessory. For example, if the accessory is a vessel, the weight information associated with the identification feature of that accessory is a value for the weight of the empty vessel.

The database may also store cooking information associated with at least one identification feature and relating to the execution of a preparation step using the accessory carrying the identification feature. The term cooking information includes any type of preparation instruction, information about an ingredient such as ingredient type, ingredient quantity or ingredient weight, or about an accessory to be used for a preparation step.

The control device is configured to detect a change in position of the at least one accessory relative to the base unit. In particular, the control device may be able to detect the assembly or removal of one or more accessories on the base unit. Alternatively or additionally, the control device can be suitable for detecting an assembly or removal of an accessory on a further, additional accessory already assembled with the base unit. For example, the control device can be used to detect the assembly of a cutting or stirring attachment or a lid on a cooking vessel.

Furthermore, the control device is configured to retrieve weight information corresponding to an identification feature detected by the detection device. Preferably, the control device can compare a detected identification feature with identification features stored in a database and retrieve weight information associated with a matching identification feature from the database.

The control device is also configured to calculate a net weight based on a gross weight detected by the weighing module and taking into account the weight information. After a gross weight has been detected by the weighing module, a change in the position of an accessory has been detected and weight information corresponding to the detected accessory has been retrieved, a net weight, i.e. the weight of any contents taken up by the accessory, can be calculated. The weight of the contents can be zero, i.e. the accessory can be empty. Preferably, the value that the weighing module measures for an empty state, i.e. when no accessory or good is assembled with the base unit, is also available. This can then also be taken into account when calculating the net weight.

For the calculation of the net weight, the amount of weight information is preferably subtracted from the detected gross weight if an assembly of an accessory has been detected, or the amount of weight information is added to the detected gross weight if a removal of an accessory has been detected.

According to a first embodiment of the kitchen appliance system, the control device is configured to detect an assembly or removal of at least one accessory with respect to the base unit and/or with respect to a further accessory by means of forming a difference between a first gross weight recorded at a first time and a second gross weight recorded at a second, later time, comparing the amount of the difference formed with at least one reference value from a database and classify the sign of the difference formed as "positive" or "negative".

Furthermore, the control device is configured to calculate the net weight by adding the weight information to the second gross weight or subtracting the weight information from the second gross weight depending on a detected assembly or removal.

With a kitchen appliance system designed in this way, an assembly or removal of an accessory on the base unit can be detected on the basis of a change in weight and a dedicated position detector can be dispensed with. This enables a compact design of the base unit.

Here, too, the value that the weighing module measures for an empty state, i.e. when no accessory or good is assembled with the base unit, is preferably taken into account when calculating the net weight.

Preferably, a gross weight is detected by the weighing module at successive points in time. Alternatively, a gross weight is recorded by the weighing module continuously in time. The smaller the time interval between two acquisitions, the higher the probability of detecting a change in weight and also being able to take it into account. Multiple, time-delayed acquisition and storage of a gross weight not only enables weight monitoring, but also retrieval of values that have been acquired in the past. For example, a variable for a weight can be reset to a previously recorded value for a gross weight.

The term "difference" is understood here as a vectorial quantity, i.e. with an absolute amount and with a sign. The sign can be positive or negative.

Based on the comparison of the difference in amount with reference values, the control device determines whether the state of use of one or more accessories on the base unit has changed.

If the comparison results in at least one match between the amount formed and a reference value from the database, the control device detects that the assembly state of an accessory corresponding to the reference value has changed. If, in a further step, the control device classifies the sign of the difference formed as positive, then the control device outputs a signal corresponding to the assembly of at least one accessory. If the sign is negative, the control device detects the removal of at least one accessory.

If the comparison shows that the amount of the difference formed does not match any of the reference values from the database, then the control device recognises that no accessory has been assembled or removed. If the amount is still not zero, the control device recognises that the change in weight is due to the addition or removal of a content contained in an accessory. By assigning the sign of the difference formed, the control device can detect an addition or removal.

If the amount is zero, the control device recognises, regardless of the sign, that no weight change has been carried out and that an accessory has neither been assembled nor removed, and also that no content has been added or removed.

According to a further embodiment of the kitchen appliance system, a position detector is provided at the base unit and is configured to detect an assembly or removal of at least one accessory with respect to the base unit and/or with respect to a further accessory and to forward this to the control device. Furthermore, the control device is configured to calculate the net weight as a function of a detected assembly or removal by adding the weight information to the detected gross weight or subtracting the weight information from the detected gross weight.

Thus, the control device automatically detects whether an accessory is assembled and whether its position allows proper interaction with the base unit, and then also offers increased user-friendliness. In addition, by providing a dedicated position detector, it is possible to determine with increased accuracy and certainty the state of use of an accessory on the base unit. Furthermore, the programming effort for the control device can be facilitated.

The position detector can be arranged in the accessory and/or in the housing of the base unit. Preferably, the accessory has at least one element which is configured to influence the position detector, and the position detector is configured to output a signal with position information depending on the influence by the element.

In particular, the interaction of the element of the accessory with the position sensing device may be designed as follows:

Opening or closing an electrical contact between the element on the accessory and the position sensing device by changing the position of the accessory relative to the base unit;

opening or closing of a magnetic contact, for example a reed contact, between an element formed as a magnet on the accessory and the position sensing device by changing the position of the accessory relative to the base unit;

detecting a change in inductance or capacitance caused by interaction of a metal part on the accessory and an active detection element of the position sensing device; detection of the intensity of the magnetic field of a magnet arranged on the accessory by an active detection element of the position detector;

detecting an identification feature from the element formed as a data carrier on the accessory; and/or Sensing a change in a speed, for example, of a cutting or stirring attachment, a temperature level.

The position of an accessory can be detected in relation to the base unit. If at least two accessories are provided, the position of a second accessory, for example a stirring attachment, can be detected in relation to the position of a first accessory, for example a stirring bowl. Overall, the position detector may be configured to detect the position of one or more accessories and the control device may be configured to automatically detect the assembly or removal of one or more accessories together. For example, it may be automatically detected whether a cooking basket is correctly assembled with a cooking vessel, and also whether the cooking vessel is in turn correctly assembled with the base unit. In this way, changes in the position of accessory combinations can be detected, whereby an accessory combination can be formed by an accessory being fitted in, on, on top of, under or over another accessory.

According to a further embodiment of the kitchen appliance system, the control device is configured to retrieve the respective corresponding weight information when several identification features are detected and to take this weight information together into account for calculating the net weight.

If several accessories are used at the same time, the net weight of each accessory can be used to calculate the net weight and thus determine the weight of a food item picked up by one of the accessories. This makes it possible, for example, when using a cooking vessel on the base unit together with an additional stirring attachment, to accurately weigh food accommodated in the cooking vessel.

Preferably, the detection device has a detection field and is configured to record machine-readable information corresponding to an identification feature format as identification features in each case and to forward it to the control device. Furthermore, the control device can compare each of the multiple identification features thus recorded with identification features from a database and determine from the comparison result which accessories are presently used.

In a particular embodiment, the control device is configured to retrieve cooking information from the identification feature database that is simultaneously applicable to all detected accessories. Cooking information relating to the execution of a preparation step with the aid of an accessory bearing a detected identification feature is applicable. For example, a cooking recipe for mashed potatoes is applicable cooking information for an accessory combination "cooking vessel" with "stirring attachment".

According to a further embodiment of the kitchen appliance system, the weight information corresponding to a detected identification feature is stored together with the identification feature on the accessory, in a memory of the control device or in an external database accessible by the control device.

Weight information stored on the accessory, for example in a data carrier located on the accessory or as a code, reduces the risk of confusion with other accessories that have a different tare weight.

Storage in the control device again allows simplified access to the weight information and it is not necessary to record the weight information together with the identification feature. For this purpose, the control device preferably has its own memory on which weight information is stored and assigned to at least one identification feature.

If the weight information is stored in an external database, it can be managed, activated, updated or changed remotely by the accessory manufacturer. This can be particularly advantageous if, for example, the weight of the accessory changes due to wear or if the wrong weight information has been stored by mistake. Preferably, the control device is configured to access the database via a communication interface.

It is particularly advantageous to store the weight information with a special format or as encrypted, machine-readable information. This avoids the use of third-party accessories.

According to another embodiment of the kitchen appliance system, the amount of weight information corresponding to a detected identification feature has been stored by the accessory manufacturer or as part of a calibration process by weighing the corresponding unfilled accessory using the weighing module.

The accessory manufacturer can store weight information on the accessory, in the control device or in a separate database. This ensures that the stored weight information corresponds to the actual weight of the accessory and also reduces incorrect storage, for example by the user.

Calibration in turn allows the weight information to be adjusted to the actual, current tare weight of accessories. Weight variations can be caused by wear, for example. Soiling of the weighing module or an accessory that would falsify the weighing can also be taken into account in this way.

In particular, weight information can be stored during the production process of the accessory by calibrating the weighing module and the control device with the help of the user, for example by actuating a tare function on a communication interface and/or by automatic calibration by the control device. A manual or automatic calibration can precede a preparation process and/or take place during the execution of a preparation process with the kitchen appliance system.

Furthermore, weight information can be assigned to an identification feature by the kitchen appliance manufacturer before the kitchen appliance is sold and/or subsequently assigned by a software update. Weight information can also be assigned in connection with the purchase of an accessory by releasing weight information in the database or making it accessible when a suitable accessory has been purchased. Alternatively or additionally, weight information can be assigned to identification features or activated when a service offer has been accepted, such as an additional service on a digital portal connected to the database. In addition, an assignment can be stored in the database by user input.

Alternatively, weight information for an accessory may be stored by the control device in the context of a learning procedure. Thus, when the accessory is first used together with the base unit, the tare weight of the accessory can be automatically determined by forming the difference between a gross weight detected without the accessory and a gross weight detected with the accessory. In particular, the weight of the accessory determined in this way can be automatically stored as weight information, which is then linked to the identification feature of the accessory in a database.

According to a further embodiment of the kitchen appliance system, the control device is configured to compare the net weight with a weight indication from a preparation instruction and to output a corresponding user instruction to add or reduce an ingredient quantity, wherein the weight indication comprises a target weight for an ingredient quantity.

In this way, the kitchen appliance system can enable a user to easily follow a preparation instruction. In particular, such a set-up of the control device in combination with the accessory recognition can provide an appropriate user instruction even if the accessory has been removed and reassembled during a preparation operation on the base unit.

In this context, the weight information is preferably a target weight for an ingredient type that is stored in the context of a preparation instruction. For example, "100 g flour" can be a weight indication for a preparation instruction designed as a cooking recipe for a cake.

Alternatively or additionally, the control device is configured to compare a detected gross weight with a weight indication from a preparation instruction and to output a corresponding user instruction to add or reduce an ingredient quantity, wherein the weight indication comprises at least a weight information for a recommended accessory and a target weight for an ingredient quantity.

In this way, a detected accessory and any content in the form of a food or an ingredient that may have been picked up by the accessory can be compared with information in a preparation instruction during its execution and a corresponding user instruction can be issued.

Here, the weight indication has, on the one hand, weight information corresponding to a tare weight of an accessory and a target weight for an ingredient type. Such a weight indication may have been created by a function of the control device. For example, if the control device has detected an assembly of an accessory and recognised the accessory, then the control device forms a weight indication by summing the amount of weight information for the recognised accessory with a stored target value for an ingredient to be currently processed according to the preparation instructions.

According to a further embodiment of the kitchen appliance system, the control device is configured to output the net weight via a communication interface as machine-readable information or as information for a user.

This allows the net weight to be used for automatic control of the kitchen appliance system in a downstream preparation step, or to serve as an indication to the user.

The net weight output by the control device as machine-readable information can be used by the control device itself to create commands for functional parts of the kitchen appliance system to perform a downstream preparation step. Alternatively or additionally, the net weight output as machine-readable information can be forwarded to another unit, for example to a server accessible via the Internet.

The control device is preferably connected to the communication interface by a bidirectional communication link so that information can be exchanged from the control device to the communication interface and also from the communication interface to the control device. Further preferred is a design of the control device for wireless access to an external database, for example via WLAN, WIFI, Bluetooth or the like. Alternatively or additionally, the control device can be designed for access to a database via a USB port or an electronic bus system.

For an output as information for a user, the communication interface is preferably designed as a user interface. A communication interface can be a user interface in the form of an acoustic, haptic or visual display, but also an interface for forwarding information to a user terminal such as a smartphone or a digital home management system. Thus, the communication interface provides information directly, i.e. for example itself as a display, or indirectly via an additional user interface.

Furthermore, the control device can first compare the net weight with a weight specification from a preparation instruction that corresponds to a target weight and then output the net weight together with the comparison result.

The above-mentioned task is also solved by a method for automatic taring for a kitchen appliance system with a base unit and with an accessory, in particular for a kitchen appliance system according to one of the above embodiments, wherein a change in position of the accessory relative to the base unit is detected, wherein a gross weight and an identification feature of an accessory are detected, wherein weight information corresponding to the detected identification feature is retrieved, and wherein a net weight is calculated on the basis of the gross weight and taking into account the weight information.

According to a first embodiment of the method, the change in position is detected by detecting a first gross weight at a first time and a second gross weight at a second, later time, by comparing the difference in amount between the first gross weight and the second gross weight with at least one reference value from a database, and by the comparison resulting in an increase of at least one reference value by the difference in amount or a match. Furthermore, the net weight is calculated based on the second gross weight and taking into account the weight information.

In this way, a change in position of an accessory on the base unit can generally be detected. With additional consideration of the sign of the difference between the first detected gross weight and the second gross weight, an assembly or removal of an accessory can be inferred.

According to a further embodiment of the method, the change in position is detected with the aid of a position detector, in particular by changing the state of an electrical contact, a magnetic contact, an inductance, a capacitance, by detecting a magnetic field, by detecting an identification feature from the element formed as a data carrier on the accessory and/or by detecting a change in a rotational speed, a temperature level. Furthermore, the net weight is calculated depending on a detected assembly or removal by adding the weight information to the gross weight or subtracting the weight information from the gross weight.

According to a further embodiment of the method, the state of a detection device configured to detect an identification feature is queried as a function of the result of a comparison of the detected gross weight or the difference in amount with at least one reference value from the database.

Thus, based on the detected gross weight or, if applicable, based on a difference in amount between a first detected gross weight and a second detected gross weight, it is first possible to estimate whether one or more accessories are attached to the base unit before a detection operation is commanded with the aid of the detection device.

According to a further embodiment of the method, the state of a detection device configured to detect an identification feature is queried if the comparison shows that the detected gross weight or amount difference matches a reference value from the database, or that the detected gross weight or amount difference exceeds a reference value from the database.

This can be used to assess the assembly or removal of one or more accessories in advance of an identification feature detection.

For example, if the comparison shows that the gross weight or the difference in amount between a first detected gross weight and a second detected gross weight matches a reference value from the database corresponding to a sum of the respective tare weights of a plurality of accessories, the detection device may be set to detect a plurality of identification features.

If the comparison results in a reference value being exceeded, then it can be assumed that at least one accessory is assembled together with an additional content or a filled accessory.

In this embodiment, absolute amounts can be compared with each other, i.e. without taking a sign into account. Alternatively or additionally, signs can be compared to detect the assembly or removal of an accessory.

According to a further embodiment of the method, the detected identification feature is compared with at least one identification feature from a database and the retrieved weight information is weight information associated with an identification feature from the database matching the detected identification feature.

Alternatively, the state of a detection device configured to detect an identification feature can be continuously interrogated. In this way, it is possible to determine whether and which accessories are used by comparing the recorded gross weight or the difference between a first recorded gross weight and a second recorded gross weight with a reference value from the database, as well as by means of an accessory identification.

In particular, if the reference values are each stored in the database in the context of a preparation instruction, it can be determined whether an accessory applicable to a preparation instruction to be carried out is actually used.

According to a further embodiment of the method, the net weight is output via a communication interface, whereby the net weight is output as machine-readable information for further use by a control device and/or as information for a user.

The method according to the invention and its embodiments have the same advantages as the kitchen appliance according to the invention and its embodiments.

The above-mentioned task is also solved with a base unit for a kitchen appliance system, with a housing, with a weighing module configured for detecting a gross weight and with a control device in that a detection device configured for detecting an identification feature of at least one accessory is provided at the base unit, and in that the control device is configured to detect a change in position of at least one accessory relative to the base unit, to call up weight information corresponding to an identification feature detected by the detection device and to calculate a net weight on the basis of a gross weight detected by the weighing module and taking into account the weight information.

The above-mentioned task is also solved with a control device for a kitchen appliance system or for a base unit for a kitchen appliance system, which is configured to carry out a method according to one of the above embodiments.

Furthermore, the above-mentioned task is solved by a computer program comprising instructions, the execution of which on at least one processor of a control device of a kitchen appliance system according to one of the embodiments described above causes the execution of a method according to an embodiment example explained above.

Further features and advantages of the present invention will be apparent from the following description of examples of embodiments, reference being made to the accompanying drawing.

BRIEF DESCRIPTION OF THE DRAWINGS

In the drawing show

DESCRIPTION OF THE INVENTION

Figure 1:
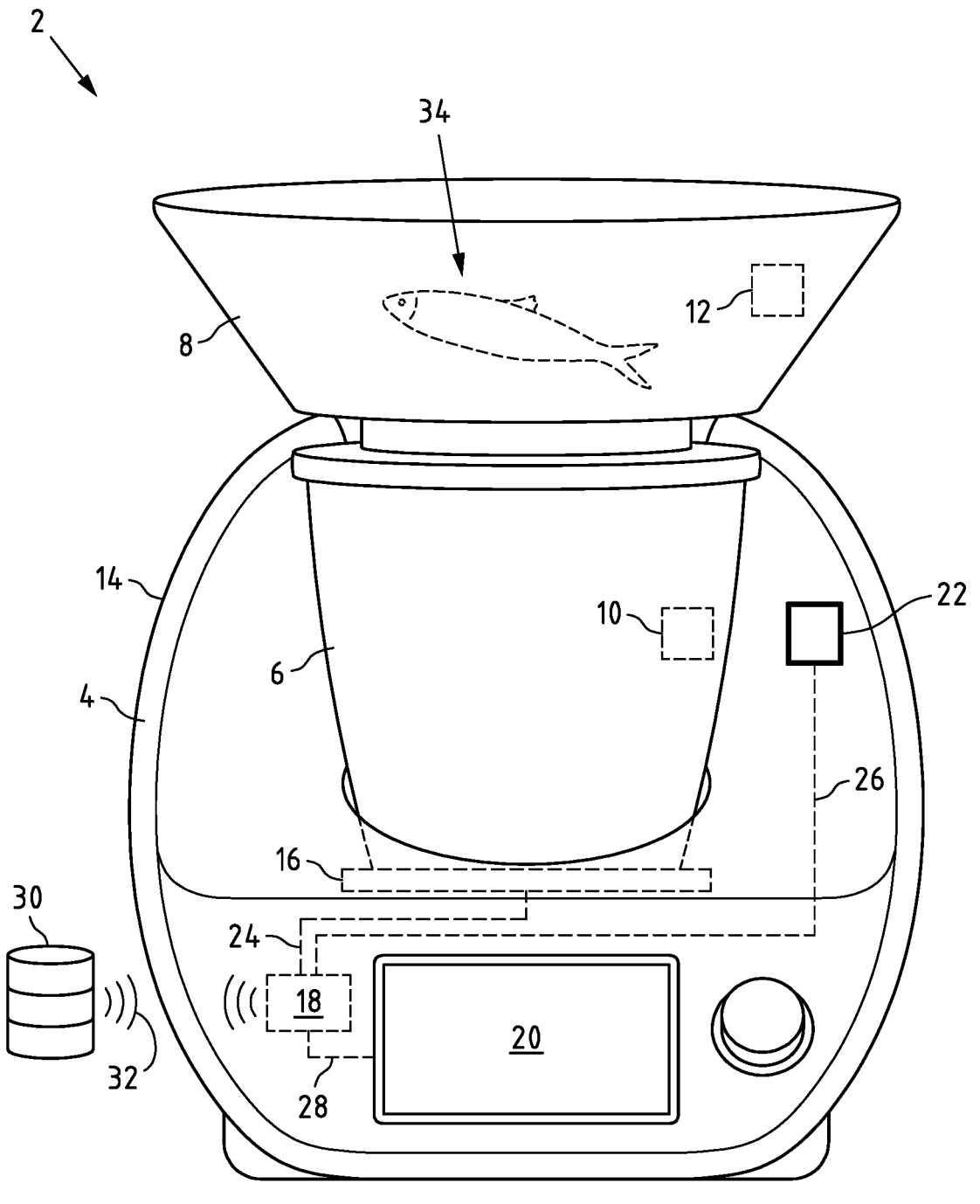
FIG. 1 a first embodiment for a kitchen appliance system.

The kitchen appliance system 2 shown in FIG. 1 has a base unit 4, a first accessory 6 designed as a cooking vessel and a second accessory 8 designed as a cooking vessel. The first accessory 6 and the second accessory 8 each have a data carrier 10, 12 on which an identifier is stored as machine-readable information.

The base unit 4 comprises a housing 14, a weighing module 16, a controller 18, a communication interface 20 and a detector 22. The weighing module 16 and the detector 22 are each configured to detect a gross weight and to detect an identifier. The weighing module 16, the detector 22 and the communication interface 20 are each connected to the controller 18 via a bidirectional communication link 24, 26, 28.

The communication interface 20 is configured as a touch-sensitive screen and is capable of displaying user instructions as well as detecting user inputs and forwarding them to the controller 18.

The controller 18 is connected for access to an external database 30 with identifiers and weight information via an overlapping communication network 32, in this case via internet and at least partially WiFi.

The kitchen appliance system 2 is shown in a condition wherein the second accessory 8 holds a content 34 and wherein the second accessory 8 is indirectly assembled with the base unit 4 via the first accessory 6.

Figure 2:
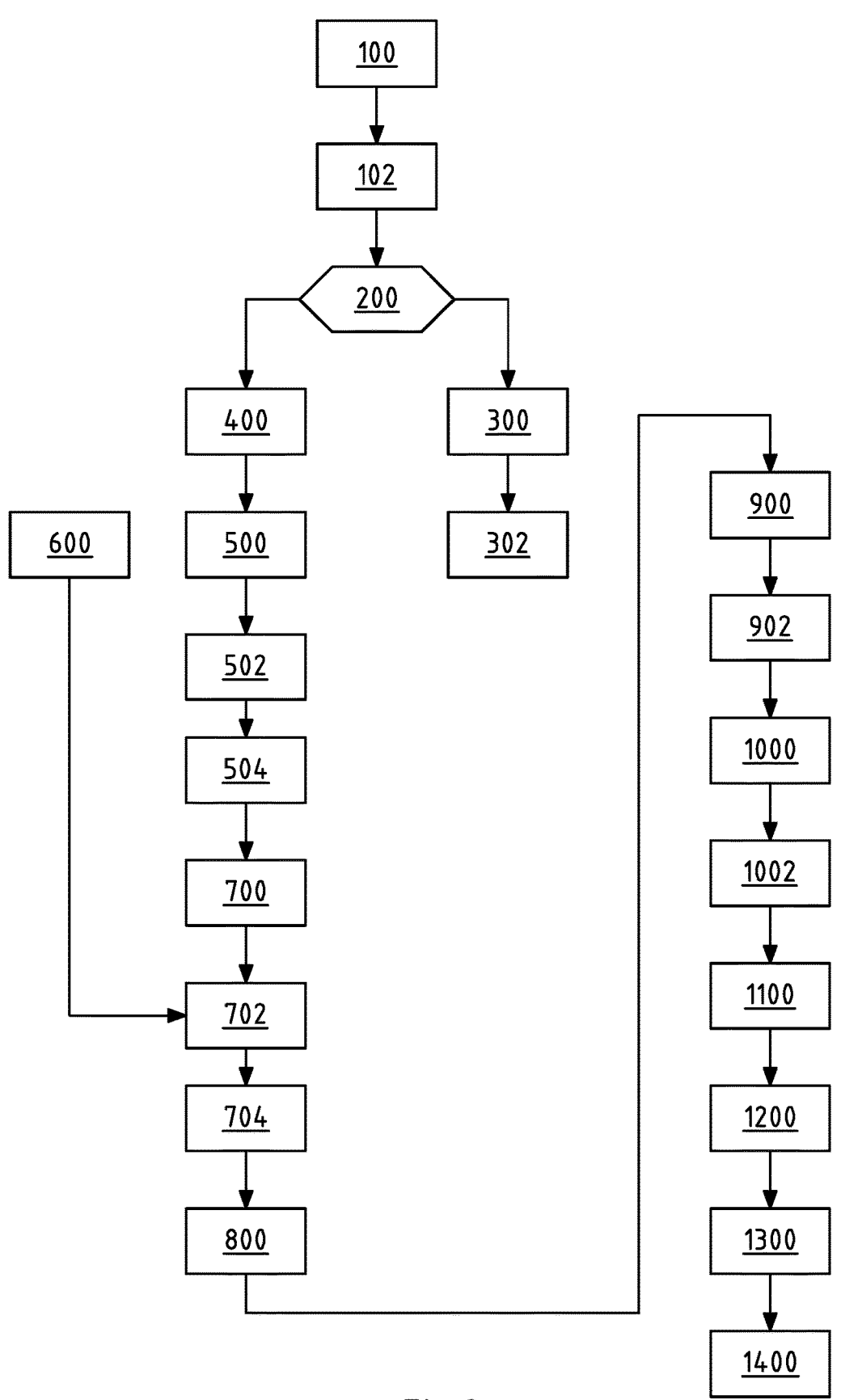
FIG. 2 an example of a method for automatic taring for a kitchen appliance system and FIG. 3 another embodiment for a kitchen appliance system.

The kitchen appliance system 2 and in particular the controller 18 are configured to carry out the process steps from FIG. 2.

FIG. 2 shows an example of a method for automatic taring for a kitchen appliance system 2 with a flow chart.

In step 100, the kitchen appliance system 2 is started up, and in step 102 it is checked whether the "automatic tare" function is basically deselected or whether it is enabled for execution. If the "automatic tare" function is enabled, then in step 200 a user request is made by the controller 18 via the communication interface 20 as to whether an "automatic tare" function should be carried out.

Subsequently, if a user input corresponding to a negative response is detected by the communication interface 20 (step 300), then in a step 302, the controller 18 inhibits execution of a method wherein a net weight is automatically calculated based on a detected gross weight and an identifier.

If a user input corresponding to a positive response is again detected (step 400), then step 500 starts a detection process using the weighing module 16 and detects a plurality of gross weights in succession (steps 502 and 504).

Parallel to the start of the acquisition process or in step 600, another user input is acquired via the communication interface 20, this time concerning a selection of preparation instructions to be carried out from the database 30.

The development of the gross weight over time is monitored in that the controller 18 regularly forms a difference between a first gross weight $B(t_1)$ detected at a first time $t_1$ and a second gross weight $B(t)$ detected at a second time $t$, $t_2$), compares the absolute amount $|B(t_2)-B(t_1)|$ of the difference $B(t_2)-B(t_1)$ formed with reference values stored in the database 30 and classifies the sign of the difference $B(t_2)-B(t_1)$ as "positive" or "negative". In FIG. 2, the acquisition at time $t_1$ and the acquisition at time $t_2$ are shown schematically with step 502 and step 504 respectively. The formation of the difference is shown by step 700, the comparison of the absolute amount $|B(t_2)-B(t_1)|$ with reference values by step 702 and the classification of the sign of the difference $B(t_2)-B(t_1)$ by step 704.

At the time $t_1$, neither an accessory nor a content was assembled or accommodated on the base unit 4. At $t_2$, the kitchen appliance system 2 is in the state shown in FIG. 1, where the second accessory 8 holds the contents 34 and is assembled together with the first accessory 6 on the base unit 4.

Thus, at time $t_1$, the weighing module 16 detects a first gross weight $B(t_1)$ (step 502) corresponding to the empty state of the base unit 4. The gross weight detected at time $t_2$ (step 504) corresponds to the sum of the value for the empty state of the base unit 4, the tare weight of the first accessory 6, the tare weight of the second accessory 8 and the tare weight of the contents 34 held by the second accessory 8.

The difference $B(t_2)-B(t_1)$ (step 700) formed by the controller 18 has a positive sign and an absolute value $|B(t_2)-B(t_1)|$ corresponding to the sum of the tare weight of the first accessory 6, the tare weight of the second accessory 8 and the tare weight of the contents 34 received by the second accessory 8.

In step 702, the controller 18 compares the absolute amount $|B(t_2)-B(t_1)|$ with reference values that have been stored in the database 30 by the manufacturer in the context of the preparation instructions selected at the beginning (step 600). The comparison results in an exceeding of a reference value that corresponds to a sum of the respective net weights of a cooking vessel and a cooking vessel.

In addition or in step 704, the controller 18 classifies the sign of the difference $B(t_2)-B(t_1)$ formed as "positive".

On the basis of the comparison result and the ordering of the sign, the controller 18 (step 800) recognises that a cooking vessel and a cooking vessel are probably assembled together with a received content on the base unit 4. However, exceeding the reference value may also mean an increased filling of a single accessory or an assembly of another accessory not provided for by the preparation instructions.

In order to confirm that the suspected accessories 6, 8 are assembled, in step 900 the controller 18 initiates a detection process by the detector 22, which detects the respective identifiers of the first accessory 6 and the second accessory 8 and forwards them to the controller 18 (step 902). Subsequently (step 1000), the controller 18 compares the respective detected identifiers with identifiers from the database 30. From a match of the detected identifiers with identifiers from the database 30, the controller 18 recognises in step 1002 that a cooking vessel and a cooking vessel are assembled with the base unit 4.

Further, in step 1100, the controller 18 retrieves the weight information E(cooking vessel) and E(cooking vessel) associated with the identifiers of the first accessory 6 and the second accessory 8 in the database 30 that match the detected identifiers, respectively.

In the subsequent step 1200, the controller 18 calculates a net weight by subtracting the amounts of the retrieved weight information E(cooking vessel) and E(cooking vessel) from the difference $B(t_2)-B(t_1)$ formed. The calculated net weight corresponds to the tare weight of the contents accommodated by the second accessory 8.

In step 1300, the controller 18 outputs the calculated net weight as a user indication via the communication interface 20 and, in step 1400, stores the calculated net weight together with an applicable ingredient type for further processing in a further preparation step of the selected preparation instructions.

Figure 3:
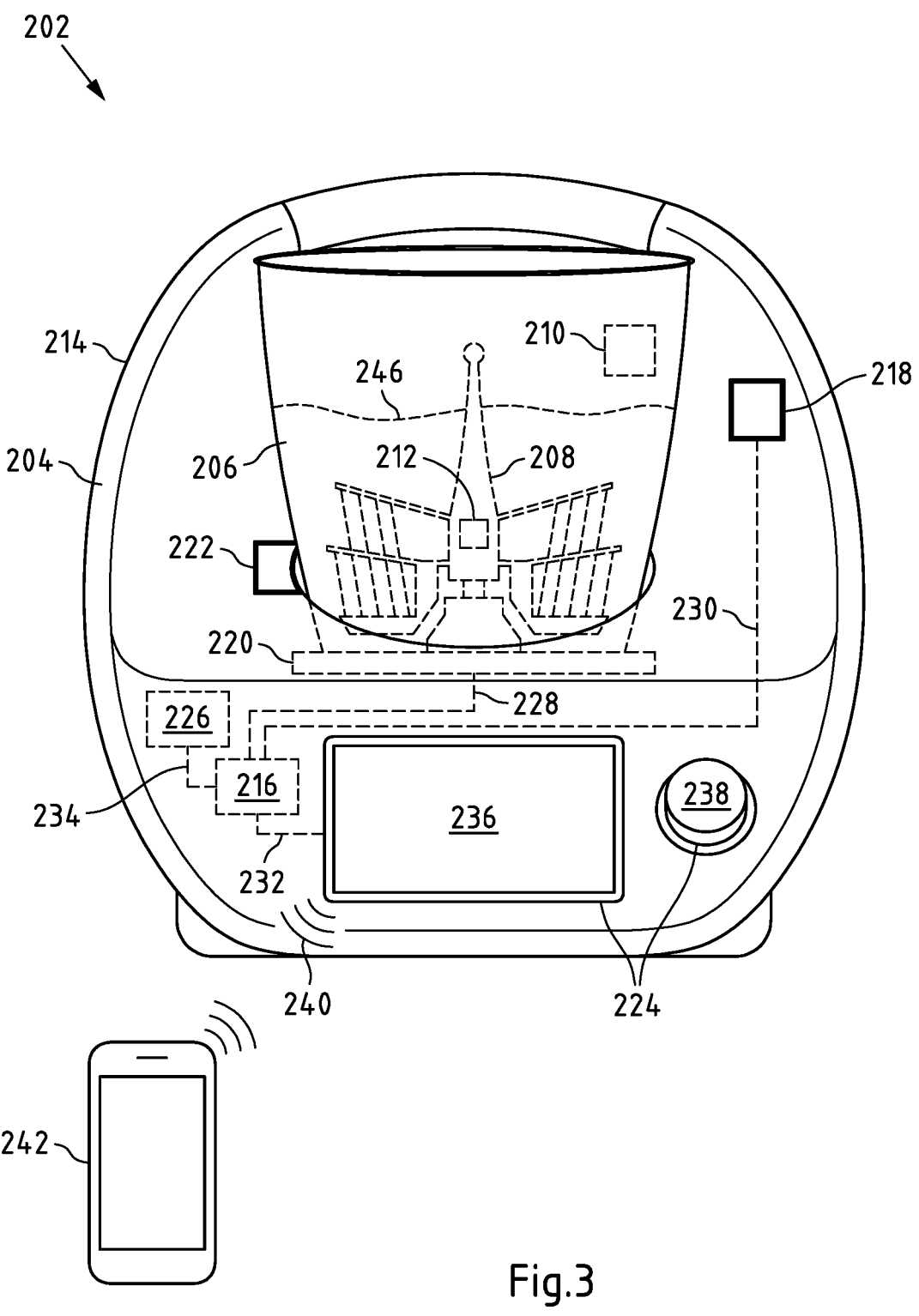

FIG. 3 shows a further embodiment for a kitchen appliance system 202. Here, the kitchen appliance system 202 has a base unit 204, a first accessory 206 designed as a vessel and a second accessory 208 designed as a stirring attachment. Each accessory 206, 208 is equipped with a data carrier 210, 212 on which a machine-readable identifier is stored.

The base unit 204 includes a housing 214, a controller 216, a sensing device 218, a weighing module 220, a position sensing device 222, a communication interface 224, and a memory 226 for a database. The weighing module 220, the sensing device 218, the communication interface 224 and the memory 226 are each connected to the controller 216 via a bidirectional communication link 228, 230, 232, 234.

As in the embodiment of FIG. 1, the weighing module 220 and the detector 218 are each configured to detect a gross weight and to detect an identifier of at least one accessory. The communication interface 224 is configured as a screen 236 and a haptic element 238, and is connectable to a mobile user interface 242 such as a smartphone via a wireless communication link 240.

The kitchen appliance system 202 and in particular the controller 216 are configured to perform the following method.

After the kitchen appliance system 202 is powered up, the weighing module 220 senses a gross weight in the empty state with no accessory assembled with the base unit 204, and the controller 216 stores this gross weight as "zero". Gross weights that are later detected in the empty state have an amount equal to zero for the controller 216.

The following describes the case wherein the first accessory 206, filled with potatoes 246 and assembled with the second accessory 208, is assembled after filling and assembly on the base unit 204.

In the course of the continuously running detection by the position detector 222, an assembly of at least one accessory on the base unit 204 is detected. In response thereto, the controller 216 initiates a detection process by the detector 218, which reads the respective data carriers 210, 212 arranged on the first accessory 206 and on the second accessory 208. In doing so, the detector 218 detects an identifier and weight information for each. Based on the detected information, the controller 216 detects that the first accessory 206 and the second accessory 208 are assembled with the base unit 204 and the respective accessory type.

The controller 216 then compares the sum of the sensed weight information to a gross weight currently sensed by the weighing module 220. If the comparison indicates that the gross weight exceeds the sum of the sensed weight information, then the controller 216 forms a net weight by subtracting the sum of the sensed weight information from the sensed gross weight.

If necessary, the controller 216 compares the calculated net weight with a target weight for an ingredient quantity from a preparation instruction from the database. In this example, the preparation instructions are a recipe for mashed potatoes with a target value of "1 kg" for the ingredient type "potatoes". If the comparison shows that the calculated net weight is less than the target weight, the controller 216 outputs a user instruction via the communication interface 224 to refill potatoes in an amount corresponding to the difference between the calculated net weight and the target value, for example "please refill 100 g potatoes".

If the kitchen appliance system 202 performs the same procedure even though no potatoes have been loaded, then the communication interface 224 may detect a user input corresponding to a confirmation of an empty state of the accessories 206, 208, i.e. that none of the accessories 206, 208 used on the base unit 204 is holding a good or potatoes. Accordingly, the controller 216 stores the currently sensed gross weight as a tare weight for any downstream preparation operation.

The invention claimed is:

1. A kitchen appliance system, wherein the kitchen appliance comprises a base unit having a housing and at least one accessory having an identifier, wherein a weighing module configured to detect a gross weight is provided at the base unit, and wherein a controller is provided at the base unit, wherein a detector, which is configured to detect an identifier of at least one accessory, is provided at the base unit, and wherein the controller is configured to detect a change in position of the at least one accessory relative to the base unit, retrieve weight information corresponding to an identifier detected by the detector; and calculate a net weight based on a gross weight detected by the weighing module and taking into account the weight information, wherein the controller is configured to determine an assembly or removal of at least one accessory with respect to the base unit and/or with respect to a further accessory by forming a difference between a first gross weight recorded at a first time and a second gross weight recorded at a second, later time, comparing the amount of the difference formed with at least one reference value from a database, and classifying the sign of the difference formed as "positive" or "negative", and wherein the controller is configured to calculate, in dependence on a detected assembly or removal, the net weight by adding the weight information to the second gross weight or subtracting the weight information from the second gross weight.

2. The kitchen appliance system according to claim 1, wherein a position detector is provided at the base unit and is configured to detect an assembly or removal of at least one accessory with respect to the base unit and/or with respect to a further accessory and to forward this to the controller, and wherein the controller is configured to calculate the net weight by adding the weight information to the detected gross weight or subtracting the weight information from the detected gross weight in dependence on a detected assembly or removal.

3. The kitchen appliance system according to claim 1, wherein the weight information corresponding to a detected identifier is saved together with the identification mark on the accessory, in a memory of the controller or in an external database accessible by the controller.

4. The kitchen appliance system according to claim 1, wherein the amount of weight information corresponding to a detected identifier has been set up by the accessory manufacturer or as part of a calibration process by weighing the corresponding unfilled accessory using the weighing module.

5. The kitchen appliance system according to claim 1, wherein the controller is configured to compare the net weight with a weight indication from a preparation instruction and to output a corresponding user instruction to add or reduce an ingredient quantity, the weight indication comprising a target weight for an ingredient quantity, and/or wherein the controller is configured to compare a detected gross weight with a weight indication from a preparation instruction and to output a corresponding user instruction add or reduce an ingredient quantity, the weight indication comprising at least weight information for a recommended accessory and a target weight for an ingredient quantity.

6. The kitchen appliance system according to claim 1, wherein the controller is configured to output the net weight via a communication interface as machine-readable information or as information for a user.

7. A method for automatic taring for a kitchen appliance system according to claim 1 having a base unit and having an accessory, wherein a change in position of the accessory relative to the base unit is detected, wherein a gross weight and an identifier of an accessory are detected, wherein weight information corresponding to the detected identifier is retrieved, and wherein a net weight is calculated based on the gross weight and taking into account the weight information.

8. The method according to claim 7, wherein the change in position is detected thereby that a first gross weight is recorded at a first time point and a second gross weight is recorded at a second, later time point, that the difference in amount between the first gross weight and the second gross weight is compared with at least one reference value from a database, and that the comparison results in an excess of at least one reference value by the difference in amount or a match, and wherein the net weight is calculated based on the second gross weight and taking into account the weight information.

9. The method according to claim 7, wherein the change in position is detected with a position detector, and wherein the net weight is calculated as a function of a detected assembly or removal by adding the weight information to the gross weight or subtracting the weight information from the gross weight.

10. The method according to claim 9, wherein the change in position is detected by detecting a change of state of an electrical contact, a magnetic contact, an inductance, a capacitance, a magnetic field, an identifier from the element designed as a data carrier on the accessory, a change in a rotational speed, and/or a temperature level.

11. The method according to claim 10, wherein the state of a detector is interrogated, wherein the detector is configured to detect an identifier as a function of the result of a comparison of the detected gross weight or the difference in amount with at least one reference value from the database.

12. The method according to claim 11, wherein the state of a detector configured to detect an identifier is interrogated, in the event where the comparison results in that:

the detected gross weight or amount difference matches a reference value from the database, or the recorded gross weight or amount difference exceeds a reference value from the database.

13. The method according to claim 12, wherein the detected identifier is compared with at least one identifier from-a database, and wherein the retrieved weight information is weight information associated with an identifier from the database that matches the detected identifier.

14. A non-transitory computer-readable medium storing a computer program comprising instructions, the execution of which on at least one processor of a controller of a kitchen appliance system causes the at least one processor to perform the method according to claim 7.

15. A kitchen appliance system, wherein the kitchen appliance comprises a base unit having a housing and at least one accessory having an identifier, wherein a weighing module configured to detect a gross weight is provided at the base unit, and wherein a controller is provided at the base unit, wherein a detector, which is configured to detect an identifier of at least one accessory, is provided at the base unit, and wherein the controller is configured to detect a change in position of the at least one accessory relative to the base unit, retrieve weight information corresponding to an identifier detected by the detector; and

calculate a net weight based on a gross weight detected by
the weighing module and taking into account the
weight information, and
retrieve the respective corresponding weight information
when a plurality of identifiers is detected and to take
this weight information together into account for cal-
culating the net weight.

* * * * *

18